Figure 1:
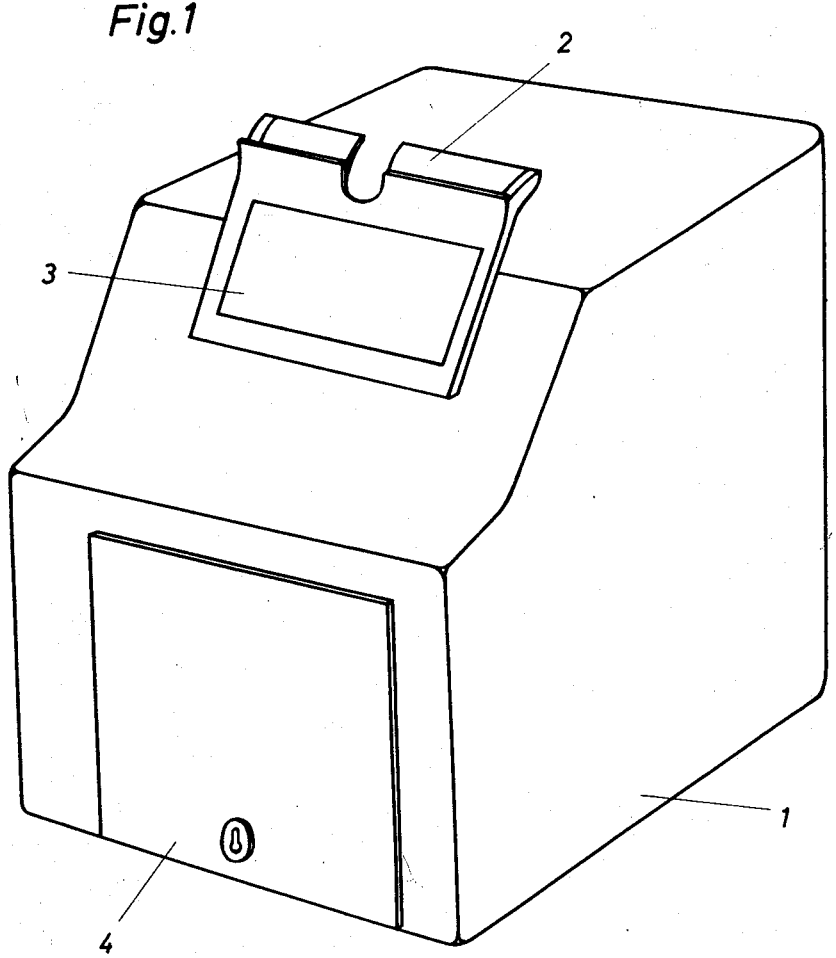

Jan. 8, 1963  U. SCHÖTTLE ETAL  3,072,324
CASH REGISTER SAFEGUARD FOR USE IN A SYSTEM FOR
AUTOMATICALLY CONTROLLING THE MOVEMENT OF GOODS
Filed April 14, 1959  3 Sheets-Sheet 1

INVENTOR.
U. SCHÖTTLE - G. REINICKE
BY Albert Reno,
Attorney

United States Patent Office 3,072,324
Patented Jan. 8, 1963

3,072,324
CASH REGISTER SAFEGUARD FOR USE IN A SYSTEM FOR AUTOMATICALLY CONTROLLING THE MOVEMENT OF GOODS
Ulrich Schöttle, Stuttgart, and Georg Reinicke, Gauting, near Munich, Germany, assignors to Standard Elektrik Lorenz Aktiengesellschaft, Stuttgart-Zuffenhausen, Germany, a corporation of Germany
Filed Apr. 14, 1959, Ser. No. 806,353
Claims priority, application Germany Apr. 17, 1958
9 Claims. (Cl. 235—11)

This invention relates to a device for effectuating a semi-automatic control for the merchandise sales made by clerks in retail stores.

It has become the acceped practice today for retailers to maintain a running inventory of their stock. This is usually accomplished by means of tear-off tickets attached to the merchandise, which are retained by the clerks upon the consummation of each sale. These tickets generally contain pertinent information with respect to the size, color, make, price, and so forth in printed and/or mechanical readable form. At the end of each business day the tickets are either automatically or manually processed and the book inventory amended to correspond with sales.

This process presents many problems to the proprietor; the absent-mindedness of the clerks in forgetting to retain the tickets, and the hap-hazard arrangement of tickets at the end of the day are two examples of common defects which defeat a proper audit. Moreover, and perhaps most important, without proper controls at the cash register the proprietor is completely at the mercy of the clerks' integrity.

Hence, it is the object of this invention to overcome the above disadvantages by providing a device for receiving the tickets in an orderly manner while preventing unauthorized entry into the cash register without a bona fide ticket.

It is a further object of this invention to provide a device which may be simply and economically adapted to existing cash registers.

The system according to the invention is characterized by a registering device as well as a cash-register which cooperate, by means of a contact arrangement which is actuated by the tear-off tickets, in such a way that the cash-register is capable of being operated only when a tear-off ticket is properly inserted into the registering device. Upon actuation of the release button of the cash-register the tear-off ticket is automatically filed in a box container capable of being locked.

The registering device is designed in such a way that the data on the inserted tear-off ticket is visible, and that once inserted the ticket is prevented from being removed again. Since the tear-off tickets, subsequent to the operations of the cash-register, are transferred to the locked box container, and have to be available for an automatic processing, all of the tickets have to be inserted in the same way. In order to effect this both the tear-off ticket and the registering device are designed in such a way that in case of a wrong insertion of the ticket an operation of the cash-register and, consequently, a filing of the ticket in the box container is rendered impossible. Besides avoiding the aforementioned disadvantages of the conventional arrangements, the invention bears the advantage that the number of cash-operations always corresponds to the number of the registered tear-off tickets.

Figure 2:
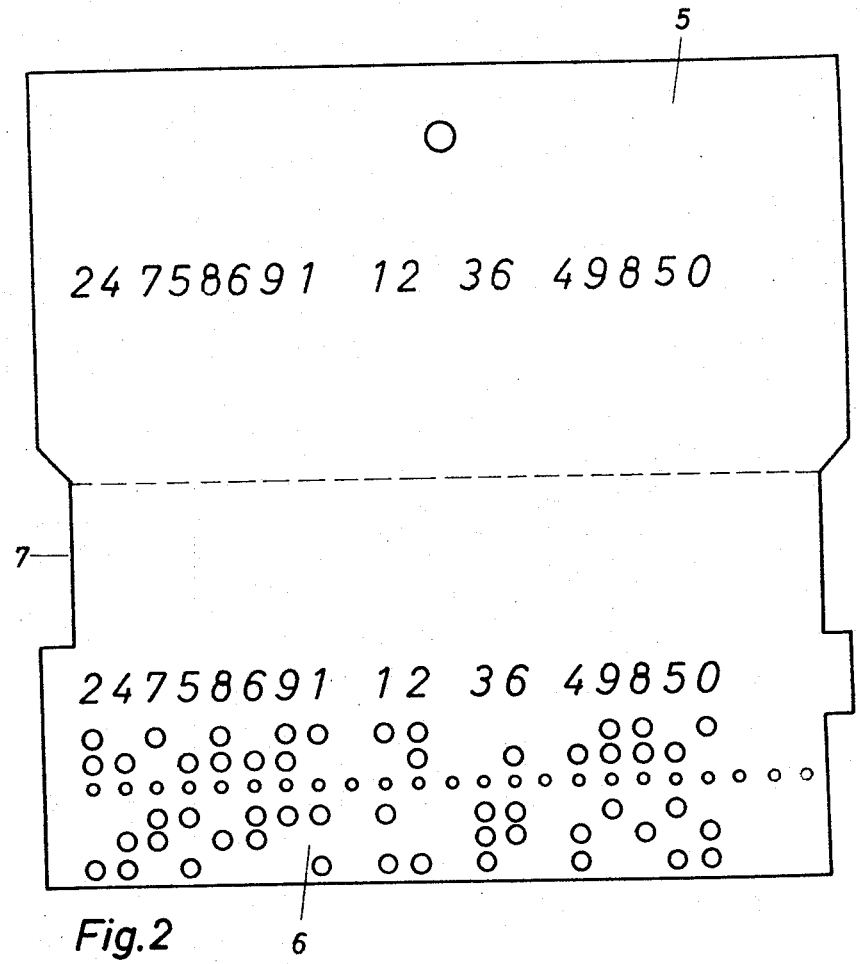
Figure 3:
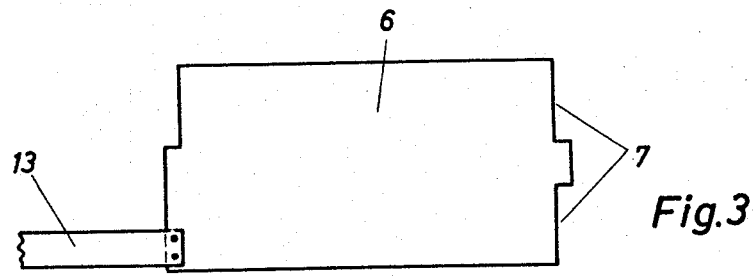
Figure 4:
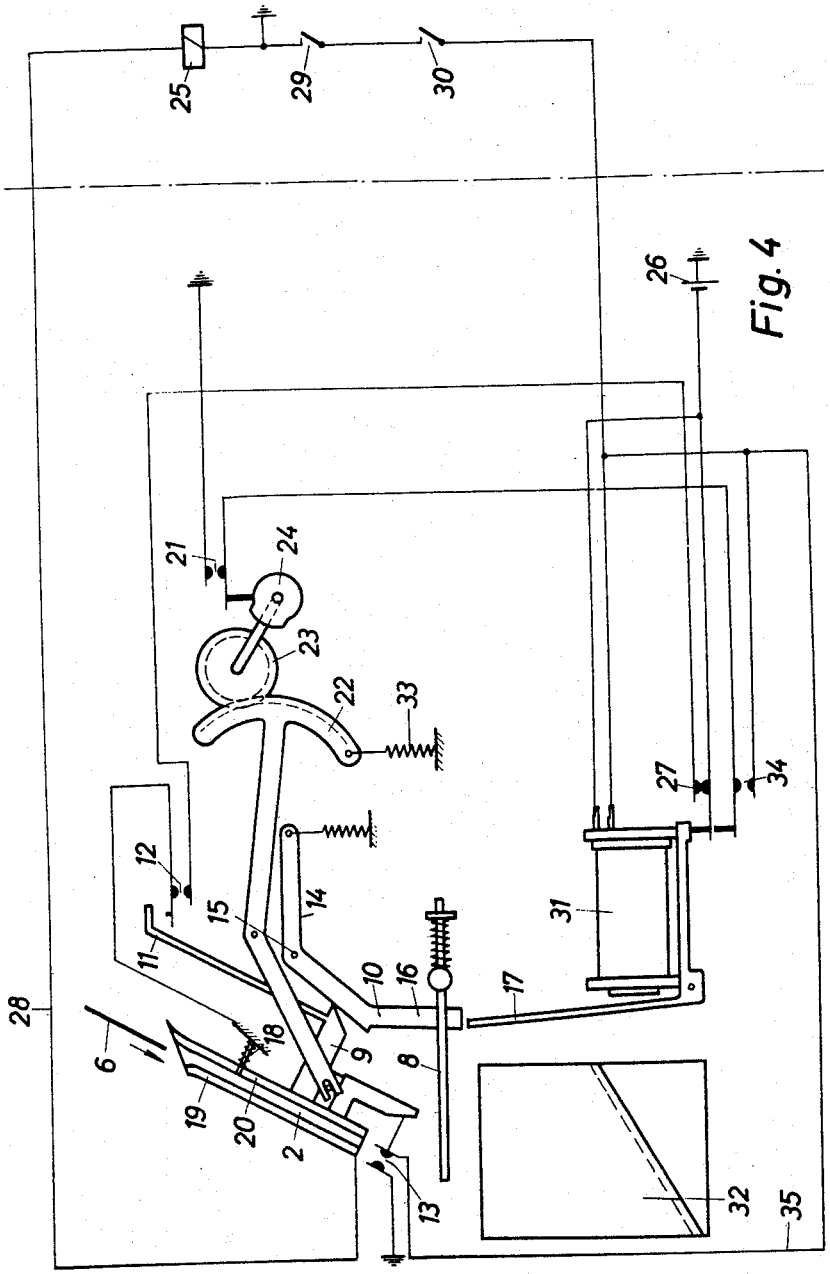

In the following the invention will now be described by way of example with reference to FIGS. 1–4 of the accompanying drawings, in which:

FIG. 1 shows a view of the registering device as employed with the system according to the invention, FIG. 2 shows a tear-off ticket, FIG. 3 shows that part of the tear-off ticket to be inserted in the registering device, and FIG. 4 shows the internal construction of the registering device.

In FIG. 1 there is shown a view of the registering device 1 which is employed with the system according to the invention. On the front side of this device there is provided the receiving facility 2, for the torn-off tickets, with the transparent portion 3 in which the data provided on the tickets is visible. The box container 4 which is capable of being locked serves to store the tickets.

FIG. 2 shows tear-off ticket consisting of the portions 5 and 6. The portion 5 remains fastened to the goods, while the portion 6 is torn-off after the sale has been closed, and is then used for operating the cash-register. In the upper part of the torn-off ticket 6 the informations which are necessary for the accounting operation are printed in plain text, and in the lower part of the ticket this data is represented by both perforations and plain text. The cut-away portions 7 to prevent the tickets from incorrect insertion, as will be explained hereinafter.

The internal construction of the registering device 1 may be seen in FIG. 4. To operate the cash-register the torn-off ticket 6 is inserted into the slot of the receiving facility 2 (input device) and drops upon the fork 8. The input device is then pressed downwardly, causing the lever 9 to engage the portion 10 of the lever arm 16. The contact 12 is simultaneously closed via the arm 11. In this condition the readable data of the torn-off ticket is visible in the transparent field 3, and the ticket itself is introduced so far into the slot that it is prevented from being pulled out again. When sliding downwardly, the left-hand edge of the ticket will pass through the contact 13. Now when the input device is depressed contacts 13 are urged together by the camming action on the adjacent 7-shaped arm attached to the input device. Since the ticket is resting on the lever 8 it will appear, with respect to contacts 13, as shown in FIG. 3 when correctly positioned and the contacts of 13 will be insulated from one another. If on the other hand the ticket is inserted upside down or in reverse, because of the unique peripheral shape of the ticket, no part of the ticket will be interposed between the contacts and they will close (as they also will should no ticket be inserted). Should the ticket be inserted with its longest dimension vertical contact 18 will not close as will be explained hereinafter.

The engagement of the lever 9 to the projecting portion 10 causes the lever 14 to be turned round its center of rotation 15, so that the lever arm 16 is pushed to the right of lever 17. In the course of this operation the pins 18 are pressed forward and meet against the wall 19 of the input device 2. This is accomplished in that pins 18 are slidably mounted in the rear wall 20 of the input device 2, and are forced to their left upon the depression of 2 by the camming surface shown contiguous to, and on the right of, these pins. In order to effectuate a second contact to work in conjunction with the pins the wall 19 is electrically insulated with respect to the rear wall 20. Upon pressing down the input device 2 the contact 21 is also closed via the toothed segment 22, the toothed wheel 23 and the cam plate 24 (for reasons which will be explained later). In this way a circuit is now established for the relay 25 extending from the voltage source 26 via the contacts 27 and 12, as well as via the pins 18, the wall 19 and the line 28. The relay 25 is disposed in the cash register and is adapted to prevent the opening thereof unless energized as described. An additional switch may be inserted in series in line 28, which is actuated by a "sales" button on the register, to further limit the opening of the register as is well known. Upon energization of the relay the contact 29 will be closed and the so-called "printing circuit" will be prepared.

After the registering process has been carried out in the cash-register the contact 30 will be closed by the restoring button, so that the relay 31 is permitted to draw current, thus attracting the armature 17. The armature 17 presses against the arm of the lever 16, so that the lever 9 is permitted to disengage the portion 10. At the same time the fork 8 is moved towards the right, thus opening the path into the box container 32 for the ticket. The restoring spring 33 returns the lever arrangement to the normal position. Via the contacts 21 and 34 the relay 31 remains energized until all mechanical restoring operations have been carried out.

Assuming that the torn-off ticket 6 is inserted improperly into the slot, then the contact 13 is permitted to close, establishing a circuit extending from ground via the contact 13, the line 35, and the winding of relay 31 to the source of current 26. Upon operation of the relay 31 the contact 27 will be opened and the circuit for the relay 25, which is arranged in the cash-register, will be interrupted. Since the relay 31 is energized prior to the complete pressing down of the input device 2 and, consequently, prior to the engagement of the lever 9 to the portion 10 of the lever 16, the armature 17 will come to lie on the right-hand side of the lever arm 16. In this way a displacement of the fork 8 towards the right is rendered impossible, and the improperly inserted ticket is prevented from dropping into the box container 32. The removal of the improperly inserted ticket, as well as the restoring of the entire arrangement may be effected either manually or automatically (not shown).

One of the objects of the pins 18 is to prevent undetected and unauthorized operation of the registering device, since an inserted ticket would still have to project out of the input device 2 subsequently to the pressing down, so that the ticket could be removed again. However, on account of this the pins 18 are prevented from meeting against the wall 19, and the circuit for the relay 25 is thus prevented from being established. A similar result obtains when the ticket is wrongly inserted so that its longest dimension is vertical.

By means of this relatively simple connection between the registering device and the cash-register it is possible to alter the existing cash-registers cheaply for adaption to the registering device. The box container containing the torn-off tickets, is capable of being locked and is accommodated inside the registering device. It is thus only capable of being removed by specially authorized personnel. When reading the state of the counter of the cash-register, when removing the box container, it is also possible to carry out a check regarding the proper amount of money in the cash-register.

While we have described above the principles of our invention in connection with specific apparatus, it is to be clearly understood that this description is made only by way of example and not as a limitation to the scope of our invention as set forth in the objects thereof and in the accompanying claims.

What is claimed is:

1. A cash register safeguard arrangement comprising cash register locking means, a register adjunct connected to said locking means for controlling the operation thereof comprising a manually actuatable ticket receiving means slidably mounted in said adjunct for a predetermined manual displacement, circuit continuity means responsive to the predetermined displacement of said receiving means for releasing said register locking means, a camming member fixed to said receiving means, and electromechanical means under control of said camming member and responsive to an incorrect ticket positioning in said receiving means for preventing the said predetermined displacement of said receiving means.

2. A cash register safeguard arrangement, as claimed in claim 1, in which the circuit continuity means includes a pair of cooperating switch contacts mounted on the ticket receiving means at a position above the proper position of a ticket and so arranged that a ticket must pass between them when inserted in said receiving means, and means for urging said switch contacts towards each other when the receiving means is displaced, whereby a ticket exceeding a predetermined height will prevent said switch contacts from meeting and thus prevent the closing of said circuit.

3. A cash register safeguard arrangement as claimed in claim 1 further comprising a pair of contacts mechanically coupled to said electromechanical means and electrically in circuit with said circuit continuity means whereby said electromechanical means not only prevents the predetermined displacement of the receiving means but also opens the circuit continuity means.

4. A cash register safeguard arrangement as claimed in claim 1 further comprising a ticket container in the register adjunct, and means including said electromechanical means for transfering a ticket from the receiving means to said container after the predetermined displacement of the receiving means.

5. A cash register safeguard arrangement as claimed in claim 4 in which the transferring means is controlled by a restore button in the cash register.

6. A cash register safeguard arrangement as claimed in claim 4 further comprising means for locking the receiving means at the predetermined displacement thereof, means under the control of the transferring means for releasing said receiving means, and means for restoring said receiving means to its predisplaced position.

7. A cash register safeguard arrangement comprising cash register locking means, a register adjunct connected to said locking means for controlling the operation thereof comprising a manually actuatable ticket receiving means slidably mounted in said adjunct for a predetermined manual displacement, a camming member on said receiving means, a lever member having a lip thereon positioned to engage said camming member upon said predetermined displacement of said receiving means whereby said receiving means is maintained at said displacement, circuit continuity means responsive to the predetermined displacement of said receiving means for releasing said register locking means, a camming member fixed to said receiving means, electromechanical means under control of said camming member and responsive to an incorrect ticket positioning in said receiving means for preventing the said predetermined displacement of said receiving means, means including said electromechanical means for releasing said receiving means when maintained at said displacement, and means for restoring the receiving means to its predisplaced position.

8. A cash register safeguarding arrangement comprising cash register locking means, a register adjunct connected to said locking means for controlling the operation thereof comprising: a manually actuatable ticket receiving means slidably mounted in said adjunct for a predetermined manual displacement; means controlled by a ticket properly positioned in said receiving means for releasing said cash register locking means when said actuatable receiving means is displaced said predetermined amount; a ticket container in said adjunct; movable stop means normally preventing a ticket in said receiving means from passing into said container; lever means mounted for limited pivotal movement adjacent said actuatable means; means for normally urging said lever means toward one limit of its pivotal movement; cam means fixed to said actuatable means for moving said lever means a predetermined distance towards the other limit of its movement when said actuatable means is displaced said predetermined amount; an extension on said lever means adapted to move adjacent said stop means when said lever means is moved said predetermined distance; a member pivotally mounted adjacent said lever means and having an end adapted to engage said extension on said lever means, after said lower means has been first moved through said predetermined distance, when said member is moved about its pivot in one direction so as to move said extension to the other limit of its movement and to move said stop means to permit a ticket to pass into said container; the end of said member acting to prevent the movement of said lever means, and thus preventing the predetermined displacement of said actuatable means, when said member has been moved about its pivot in said one direction before said actuatable means is moved, first means operable only if said releasing means is operated for moving said member in said one direction; and second means including a portion of said first means for moving said member in said one direction and operable when the operation of said actuatable means is initiated only if a ticket is improperly positioned in said ticket receiving means.

9. A cash register safeguarding arrangement comprising cash register locking means, a register adjunct connected to said locking means for controlling the operation thereof comprising: a manually actuatable ticket receiving means slidably mounted in said adjunct for a predetermined manual displacement; electric circuit means, including a pair of contacts, for releasing said cash register locking means when said actuatable means is displaced said predetermined amount said contacts being mounted on said ticket receiving means in such a position that a ticket must pass between and beyond said contacts to reach the proper position in said receiving means, so that a ticket exceeding a predetermined height will prevent the closing of said contacts; a ticket container in said adjunct; movable stop means normally preventing a ticket in said receiving means from passing into said container; lever means mounted for limited pivotal movement adjacent said actuatable means; means for normally urging said lever means towards one limit of its pivotal movement; cam means fixed to said actuatable means for moving said lever means a predetermined distance towards the other limit of its movement when said actuatable means is displaced said predetermined amount; an extension on said lever means adapted to move adjacent said stop means when said lever means is moved said predetermined distance; a member pivotally mounted adjacent said lever means and having an end adapted to engage the extension on said lever means after said lever means has been first moved through said predetermined distance, when said member is moved about its pivot in one direction so as to move said extension to the other limit of its movement and to move said stop means to permit a ticket to pass into said container; the end of said member acting to prevent the movement of said lever means and thus preventing the predetermined displacement of said actuatable means, when said member has been moved about its pivot in said one direction before said actuatable means is moved; electromagnetic means for moving said member in said one direction; first independent means for energizing said electromagnetic means; and second means for energizing said electromagnetic means responsive to a less than predetermined displacement of said actuatable means when a ticket is improperly positioned in said ticket receiving means.

References Cited in the file of this patent

UNITED STATES PATENTS

| | | |
|---|---|---|
| 2,878,872 | Burns et al. | Mar. 24, 1959 |
| 2,936,113 | Clark | May 10, 1960 |